US006799857B2

(12) United States Patent
Martinson

(10) Patent No.: US 6,799,857 B2
(45) Date of Patent: Oct. 5, 2004

(54) LATERAL-VIEW MIRROR ASSEMBLY FOR A VEHICLE

(76) Inventor: Lowell Martinson, 16455 S. 15th St., Phoenix, AZ (US) 85048

( * ) Notice: Subject to any disclaimer, the term of this patent is extended or adjusted under 35 U.S.C. 154(b) by 67 days.

(21) Appl. No.: 10/216,683

(22) Filed: Aug. 12, 2002

(65) Prior Publication Data

US 2003/0048552 A1 Mar. 13, 2003

Related U.S. Application Data

(63) Continuation-in-part of application No. 09/875,212, filed on Jun. 7, 2001, now abandoned.

(51) Int. Cl.[7] .......................... G02B 5/08; G02B 7/182; G60R 1/08
(52) U.S. Cl. ...................... 359/850; 359/850; 359/855; 359/857; 359/871; 359/900
(58) Field of Search ................................. 359/850, 855, 359/856, 857, 858, 859, 861, 862, 863, 864, 865, 866, 872, 881, 871, 900

(56) References Cited

U.S. PATENT DOCUMENTS 5,280,386 A * 1/1994 Johnson 5,666,227 A * 9/1997 Ben-Ghiath

FOREIGN PATENT DOCUMENTS

| DE | 1803363 | * 6/1970 |
|----|---------|----------|
| DE | 2600223 | * 7/1977 |
| DE | 3023208 | * 3/1982 |
| DE | 3122948 | * 12/1982 |
| JP | 0143156 | * 7/1985 |
| JP | 9-267690 | * 10/1997 |
| NL | 6407141 | * 12/1964 |

* cited by examiner

Primary Examiner—Ricky D. Shafer
(74) Attorney, Agent, or Firm—Craig Weiss; Jeffrey Weiss; Weiss, Moy & Harris, P.C.

(57) ABSTRACT

A lateral-view mirror assembly having a first lateral-view mirror and a second lateral-view mirror coupled to a spoiler of a vehicle and dimensioned to provide a driver of a vehicle with the ability to view objects positioned lateral to a rear portion of the vehicle by looking at a reflection of the objects reflected from the first and second lateral-view mirrors to a rear-view mirror to the driver.

12 Claims, 3 Drawing Sheets

LATERAL-VIEW MIRROR ASSEMBLY FOR A VEHICLE

CROSS-REFERENCE TO RELATED APPLICATIONS

This is a continuation-in-part of U. S. patent application Ser. No. 09/875,212 filed Jun. 7, 2001, now abandoned in the name of the Applicant, to which priority is claimed.

FIELD OF THE INVENTION

This invention relates generally to mirrors for vehicles designed to aid a driver in identifying objects and, more specifically, to a lateral-view mirror assembly coupled to the spoiler of a vehicle and dimensioned to allow a driver to view objects positioned lateral to a rear portion of the vehicle.

BACKGROUND OF THE INVENTION

Driving a car or other vehicle safely requires the driver to constantly be able to see other vehicles, objects and pedestrians. This is often difficult since a car has many blindspots, and the driver generally is facing forward with limited ability to turn around and view surrounding areas. One situation where a driver's limited field of vision presents an especially acute problem is when pulling out of a parking spot. When a driver needs to back out of a parking space in which he or she is parked face-forward between two other vehicles, especially when those vehicles are large in size, the driver has no ability to see laterally to either side of the rear portion of his or her vehicle to determine if there are pedestrians or other vehicles about to cross into his or her path. Often, most drivers in this situation simply back out slowly in an attempt to alert pedestrians and other cars of the vehicle's presence. This method is fraught with danger. It is often the case that pedestrians walking through a parking lot simply do not see a car as it backs out. The same is the case for another vehicle or a bike which might be passing quickly behind the driver's vehicle as he or she backs out. In all of these cases, it is the parked vehicle's driver who is responsible for insuring that his or her car does not strike a pedestrian or vehicle. In order to be sure that a pedestrian or vehicle is not approaching, the driver must be able to see laterally from a rear portion of the driver's vehicle.

Positioning a lateral-view mirror on a top surface of a rear portion of a vehicle is one way to assist a driver to be able to see objects positioned lateral to a rear end of a vehicle. However, some drivers may not prefer, for aesthetic reasons, to place a lateral view mirror on a top surface of a rear portion of a vehicle.

Thus, a need existed for a lateral-view mirror assembly coupled to a spoiler of a vehicle, and in a line of sight with a car's rear-view mirror, and dimensioned to allow a driver to view people, vehicles and other objects positioned lateral to a rear portion of the vehicle.

SUMMARY OF THE INVENTION

An object of the present invention is to provide a lateral-view mirror assembly for a vehicle capable of providing a driver with the ability to view objects positioned lateral to a rear portion of the vehicle by looking at a reflection of the objects reflected from lateral-view mirrors coupled to a spoiler of a vehicle and positioned in a line of sight with the rear-view mirror.

BRIEF DESCRIPTION OF THE PREFERRED EMBODIMENTS

In accordance with one embodiment of the present invention, a lateral-view mirror assembly for a vehicle is disclosed, comprising, in combination, a spoiler having a top surface and a bottom surface and coupled to a top area of a rear portion of the vehicle, a first lateral-view mirror coupled to the spoiler proximate a passenger's side portion of the vehicle, the first lateral-view mirror is positioned in a line of sight with a rear-view mirror of the vehicle, the first lateral-view mirror is dimensioned to allow a driver to view objects positioned lateral to a passenger's side of a rear portion of the vehicle by looking at a reflection of the objects reflected from the first lateral-view mirror to the rear-view mirror to the driver, and a second lateral-view mirror coupled to the spoiler proximate a driver's side portion of the vehicle, the second lateral-view mirror is positioned in a line of sight with the rear-view mirror, the second lateral-view mirror is dimensioned to allow a driver to view objects positioned lateral to a driver's side of a rear portion of the vehicle by looking at a reflection of the objects reflected from the second lateral-view mirror to the rear-view mirror to the driver.

In accordance with another embodiment of the present invention, a lateral-view mirror assembly for a vehicle is disclosed, comprising, in combination, a first lateral-view mirror coupled to a spoiler of a vehicle proximate a passenger's side portion of the vehicle, the first lateral-view mirror is positioned in a line of sight with a rear-view mirror of the vehicle, the first lateral-view mirror is dimensioned to allow a driver to view objects positioned lateral to a passenger's side of a rear portion of the vehicle by looking at a reflection of the objects reflected from the first lateral-view mirror to the rear-view mirror to the driver, and a second lateral-view mirror coupled to the spoiler proximate a driver's side portion of the vehicle, the second lateral-view mirror is positioned in a line of sight with the rear-view mirror, the second lateral-view mirror is dimensioned to allow a driver to view objects positioned lateral to a driver's side of a rear portion of the vehicle by looking at a reflection of the objects reflected from the second lateral-view mirror to the rear-view mirror to the driver.

In accordance with yet another embodiment of the present invention, a method for viewing objects positioned lateral to a rear portion of a vehicle is disclosed, comprising, in combination, the steps of providing a first lateral-view mirror, coupling the first lateral-view mirror to a spoiler of a vehicle proximate a passenger's side portion of the vehicle so that the first lateral-view mirror is positioned in a line of sight with a rear-view mirror of the vehicle and dimensioned to allow a driver to view objects positioned lateral to a passenger's side of a rear portion of the vehicle by looking at a reflection of the objects reflected from the first lateral-view mirror to the rear-view mirror to the driver, providing a second lateral-view mirror, coupling the second lateral-view mirror to a spoiler of a vehicle proximate a driver's side portion of the vehicle so that the second lateral-view mirror is positioned in a line of sight with a rear-view mirror of the vehicle and dimensioned to allow a driver to view objects positioned lateral to a driver's side of a rear portion of the vehicle by looking at a reflection of the objects reflected from the second lateral-view mirror to the rear-view mirror to the driver, and the driver looking into the rear-view mirror so as to view objects positioned lateral to a rear portion of the vehicle.

The foregoing and other objects, features, and advantages of the invention will be apparent from the following, more particular description of the preferred embodiments of the invention, as illustrated in the accompanying drawings.

DETAILED DESCRIPTION OF THE PREFERRED EMBODIMENTS

Figure 1:
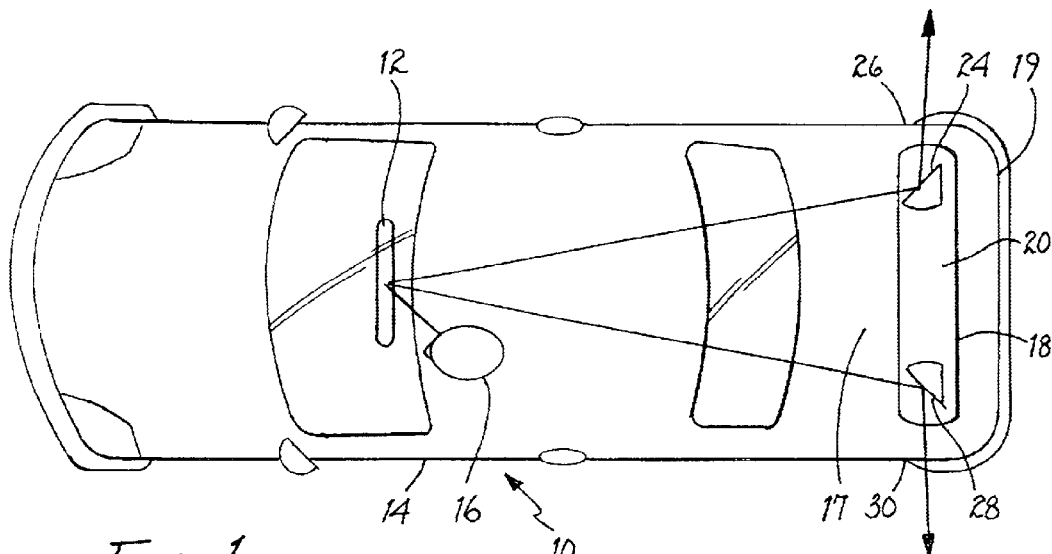
FIG. 1 is a top view of an embodiment of the lateral-view mirror assembly of the present invention, showing the line of sight between the driver, the rear view mirror and the lateral-view mirrors.
Figure 3:
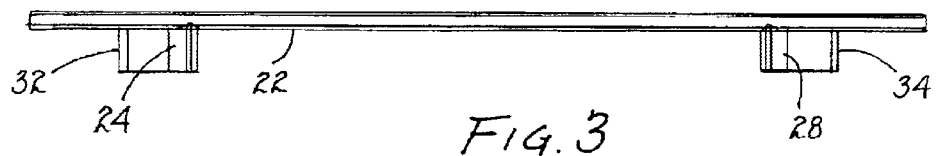
FIG. 3 is a front view of the spoiler and lateral-view mirrors of FIG. 2.

Referring to FIG. 1, reference number 10 refers generally to one embodiment of the lateral-view mirror assembly for a vehicle of the present invention. The lateral-view mirror assembly 10 comprises a spoiler 18 having a top surface 20 and a bottom surface 22 (shown in FIGS. 3, 6, and 9). The spoiler 18 is coupled to a top area 17 of a rear portion 19 of a vehicle 14.

Still referring to FIG. 1, the lateral-view mirror assembly 10 further comprises a first lateral-view mirror 24 coupled to the spoiler 18 proximate a passenger's side portion 26 of the vehicle 14. The first lateral-view mirror 24 is positioned in a line of sight with a rear-view mirror 12 in order to allow a driver 16 to view objects positioned lateral to a passenger's side 26 of the rear portion 19 of the vehicle 14 by looking at a reflection of the objects reflected from the first lateral-view mirror 24 to the rear-view mirror 12 to the driver 16.

Still referring to FIG. 1, the lateral-view mirror assembly 10 further comprises a second lateral-view mirror 28 coupled to the spoiler 18 proximate a driver's side portion 30 of the vehicle 14. The second lateral-view mirror 28 is positioned in a line of sight with the rear-view mirror 12 in order to allow the driver 16 to view objects positioned lateral to a driver's side 30 of the rear portion 19 of the vehicle 14 by looking at a reflection of the objects reflected from the second lateral-view mirror 28 to the rear-view mirror 12 to the driver 16.

Figure 2:
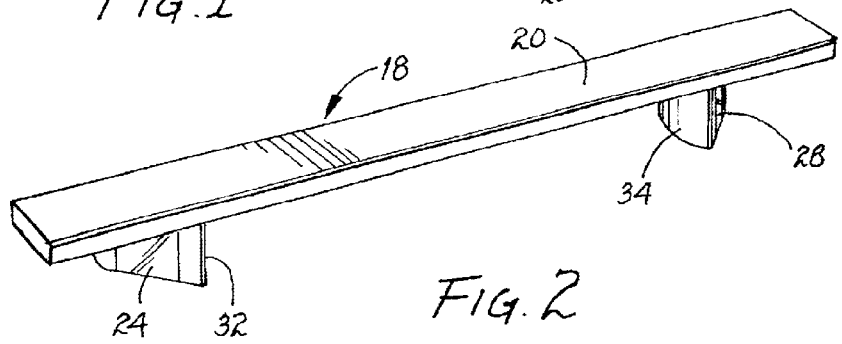
FIG. 2 is a perspective view of an embodiment of the lateral-view mirror assembly of the present invention, showing a spoiler of a vehicle having the lateral-view mirrors coupled to a bottom portion thereof.
Figure 4:
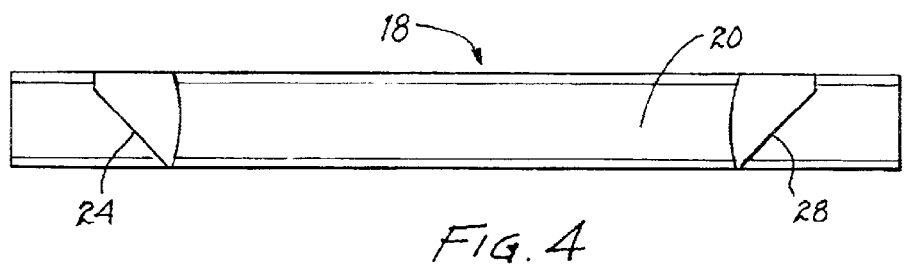
FIG. 4 is a top view of the spoiler and lateral-view mirrors of FIG. 2, the lateral-view mirrors are shown in phantom.

There are several locations where the first lateral-view mirror 24 and the second lateral-view mirror 28 can be coupled to the spoiler 18. In one embodiment (shown in FIGS. 2–4), the first lateral-view mirror 24 is coupled to the bottom surface 22 of the spoiler 18 proximate the passenger's side portion 26 (shown in FIG. 1) of the vehicle 14 (shown in FIG. 1) and the second lateral-view mirror 28 is coupled to the bottom surface 22 of the spoiler 18 proximate the driver's side portion 30 (shown in FIG. 1) of the vehicle 14 (shown in FIG. 1). Preferably, the first lateral-view mirror 24 is coupled to (or itself comprises) a first vertical support 32 (shown in FIGS. 2–3) of the spoiler 18 and the second lateral-view mirror 28 is coupled to (or itself comprises) a second vertical support 34 (shown in FIGS. 2–3) of the spoiler 18. While, in this embodiment, the first lateral-view mirror 24 is coupled to the first vertical support 32 and the second lateral-view mirror 26 is coupled to the second vertical support 34, it should be clearly understood that substantial benefit could be derived from an alternative embodiment of the lateral-view mirror assembly 10 in which the first lateral-view mirror 24 and the second lateral-view mirror 28 are not coupled to the first vertical support 32 and the second vertical support 34, respectively, so long as the first lateral-view mirror 24 and the second lateral-view mirror 28 are in a line of sight with the rear-view mirror 12. It should be noted further substantial benefit would be provided by a configuration in which the first lateral-view mirror 24 and the second lateral-view mirror 28 are positioned below the spoiler 18, yet not in direct physical contact with the spoiler 18.

Figure 5:
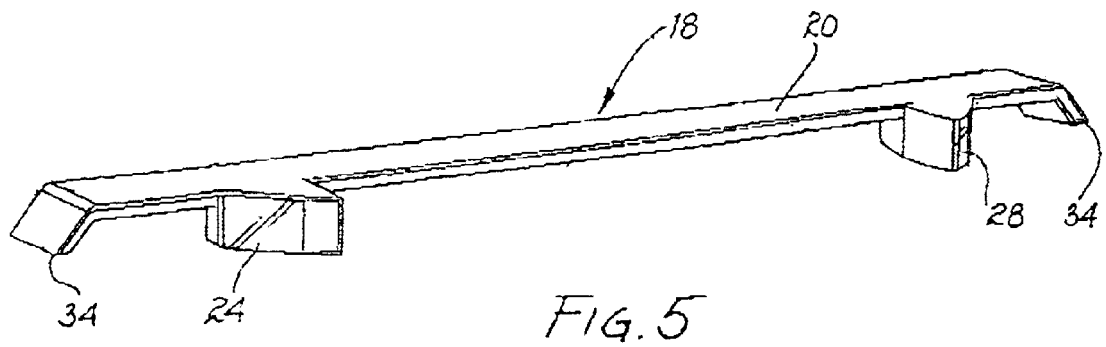
FIG. 5 is a perspective view of an embodiment of the lateral-view mirror assembly of the present invention, showing a spoiler of a vehicle having the lateral-view mirrors coupled to a front portion thereof.
Figure 6:
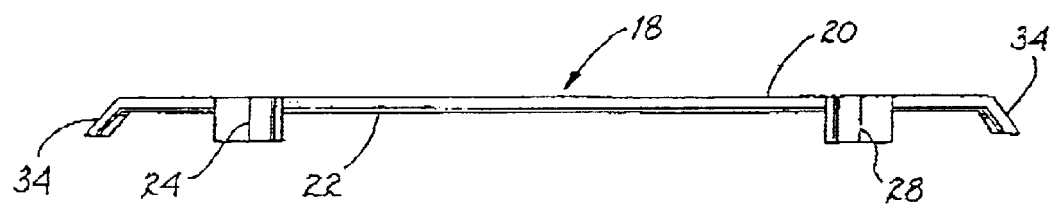
FIG. 6 is a front view of the spoiler and lateral-view mirrors of FIG. 5.
Figure 7:
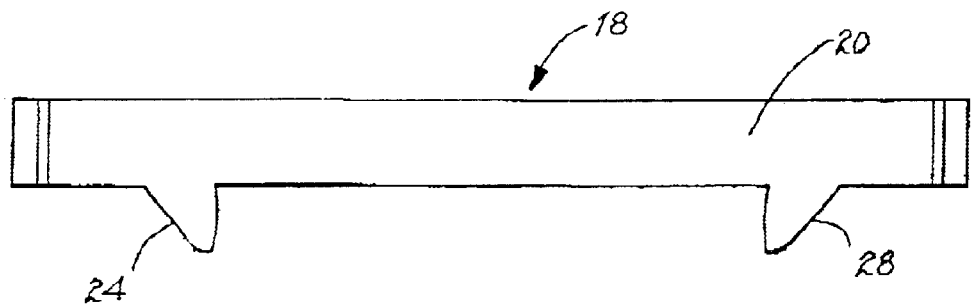
FIG. 7 is a top view of the spoiler and lateral-view mirrors of FIG. 5.

Referring now to FIGS. 5–7, an alternative coupling site for the first lateral-view mirror 24 and the second lateral-view mirror 28 is shown. The embodiment shown in FIGS. 5–7 is essentially the same as the embodiment shown in FIGS. 2–4, although the first lateral-view mirror 24 and the second lateral-view mirror 28 project forward from the spoiler 18, instead of being positioned underneath the spoiler 18. In this embodiment, the first lateral-view mirror 24 is coupled to a front portion of the spoiler 18 proximate the passenger's side portion 26 (shown in FIG. 1) of the vehicle 14 (shown in FIG. 1) and the second lateral-view mirror 28 is coupled to the front portion of the spoiler 18 proximate the driver's side portion 30 (shown in FIG. 1) of the vehicle 14 (shown in FIG. 1).

Figure 8:
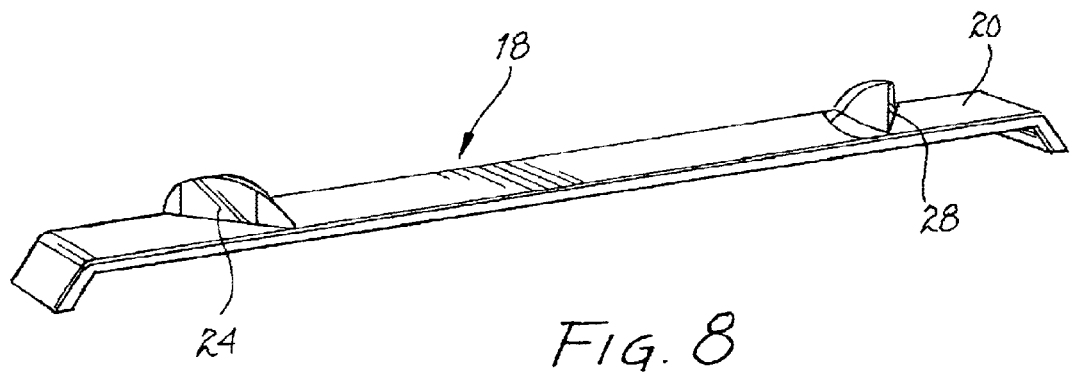
FIG. 8 is a perspective view of an embodiment of the lateral-view mirror assembly of the present invention, showing a spoiler of a vehicle having the lateral-view mirrors coupled to a top portion thereof.
Figure 9:
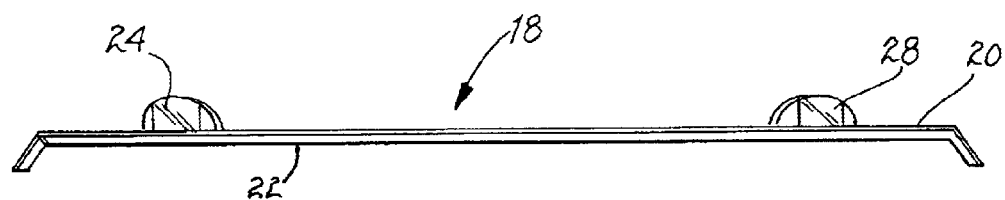
FIG. 9 is a front view of the spoiler and lateral-view mirrors of FIG. 8.
Figure 10:
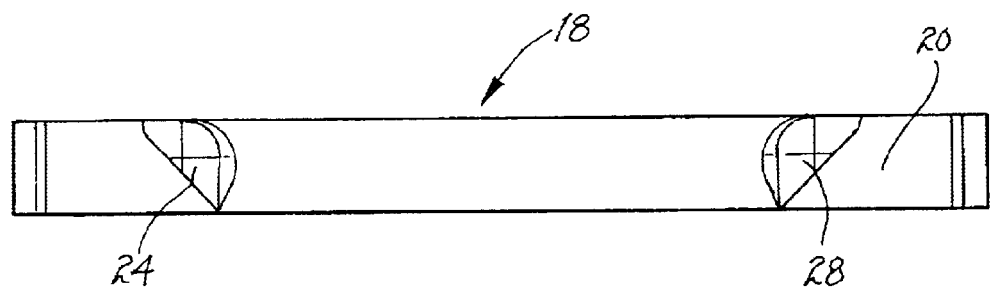
FIG. 10 is a top view of the spoiler and lateral-view mirrors of FIG. 8.

Referring now to FIGS. 8–10, an alternative coupling site for the first lateral-view mirror 24 and the second lateral-view mirror 28 is shown. The embodiment shown in FIGS. 8–10 is essentially the same as the embodiment shown in FIGS. 2–4 and common reference numbers are accordingly utilized, except that the first lateral-view mirror 24 and the second lateral-view mirror 28 are coupled to a top surface 20 of the spoiler 18, instead of a bottom surface 22 of the spoiler 18. In this embodiment, the first lateral-view mirror 24 is coupled to the top surface 20 of the spoiler 18 proximate the passenger's side portion 26 (shown in FIG. 1) of the vehicle 14 (shown in FIG. 1) and the second lateral-view mirror 28 is coupled to the top surface 20 of the spoiler 18 proximate the driver's side portion 30 (shown in FIG. 1) of the vehicle 14 (shown in FIG. 1).

It should be understood that although the drawings disclose a car 14, the lateral-view mirror assembly 10 could be coupled to any type of automobile or other vehicle that has a spoiler 18. It should also be understood that the spoiler 18, the first lateral-view mirror 24 and the second lateral-view mirror 28 may either form a one-piece, integrated structure, or it may also be beneficial for the first lateral-view mirror 24 and the second lateral-view mirror 28 to be coupled to the spoiler 18 of a vehicle 14 at a post-manufacturing stage.

While the invention has been particularly shown and described with reference to preferred embodiments thereof, it will be understood by those skilled in the art that the foregoing and other changes in form and details may be made therein without departing from the spirit and scope of the invention.

I claim:

1. A lateral-view mirror assembly for a vehicle comprising, in combination:

a spoiler having a top surface and a bottom surface and coupled to a top area of a rear portion of said vehicle;

a first lateral-view mirror attached to said spoiler proximate a passenger's side portion of said vehicle, said first lateral-view mirror is positioned in a line of sight with a rear-view mirror of said vehicle, said first lateral-view mirror is dimensioned to allow a driver to view objects positioned lateral to a passenger's side of a rear portion of said vehicle by looking at a reflection of said objects reflected from said first lateral-view mirror to said rear-view mirror to said driver; and a second lateral-view mirror attached to said spoiler proximate a driver's side portion of said vehicle, said second lateral-view mirror is positioned in a line of sight with said rear-view mirror, said second lateral-view mirror is dimensioned to allow a driver to view objects positioned lateral to a driver's side of a rear portion of said vehicle by looking at a reflection of said objects reflected from said second lateral-view mirror to said rear-view mirror to said driver.

2. The assembly of claim 1 wherein said first lateral-view mirror is attached to said top surface of said spoiler proximate a passenger's side portion of said vehicle and said second lateral-view mirror is attached to said top surface of said spoiler proximate a driver's side portion of said vehicle.

3. The assembly of claim 1 wherein said first lateral-view mirror is attached to said bottom surface of said spoiler proximate a passenger's side portion of said vehicle and said second lateral-view mirror is attached to said bottom surface of said spoiler proximate a driver's side portion of said vehicle.

4. The assembly of claim 1 wherein said first lateral-view mirror is attached to a first vertical support of said spoiler and said second lateral-view mirror is attached to a second vertical support of said spoiler.

5. The assembly of claim 1 wherein said first lateral-view mirror projects forward from a front portion of said spoiler proximate a passenger's side portion of said vehicle and said second lateral-view mirror projects forward from a front portion of said spoiler proximate a driver's side portion of said vehicle.

6. The assembly of claim 1 wherein said spoiler and said first lateral view mirror and said second lateral view mirror form a one-piece integrated structure.

7. A lateral-view mirror assembly for a vehicle comprising, in combination:

a first lateral-view mirror attached to a spoiler of a vehicle proximate a passenger's side portion of said vehicle, said first lateral-view mirror is positioned in a line of sight with a rear-view mirror of said vehicle, said first lateral-view mirror is dimensioned to allow a driver to view objects positioned lateral to a passenger's side of a rear portion of said vehicle by looking at a reflection of said objects reflected from said first lateral-view mirror to said rear-view mirror to said driver; and a second lateral-view mirror attached to said spoiler proximate a driver's side portion of said vehicle, said second lateral-view mirror is positioned in a line of sight with said rear-view mirror, said second lateral-view mirror is dimensioned to allow a driver to view objects positioned lateral to a driver's side of a rear portion of said vehicle by looking at a reflection of said objects reflected from said second lateral-view mirror to said rear-view mirror to said driver.

8. The assembly of claim 7 wherein said first lateral-view mirror is attached to a top surface of said spoiler proximate a passenger's side portion of said vehicle and said second lateral-view mirror is attached to a top surface of said spoiler proximate a driver's side portion of said vehicle.

9. The assembly of claim 7 wherein said first lateral-view mirror is attached to a bottom surface of said spoiler proximate a passenger's side portion of said vehicle and said second lateral-view mirror is attached to a bottom surface of said spoiler proximate a driver's side portion of said vehicle.

10. The assembly of claim 7 wherein said first lateral-view mirror is attached to a first vertical support of said spoiler and said second lateral-view mirror is attached to a second vertical support of said spoiler.

11. The assembly of claim 7 wherein said first lateral-view mirror projects forward from a front portion of said spoiler proximate a passenger's side portion of said vehicle and said second lateral-view mirror projects forward from a front portion of said spoiler proximate a driver's side portion of said vehicle.

12. A method for viewing objects positioned lateral to a rear portion of a vehicle comprising, in combination, the steps of:

providing a first lateral-view mirror;

attaching said first lateral-view mirror to a spoiler of a vehicle proximate a passenger's side portion of said vehicle so that said first lateral-view mirror is positioned in a line of sight with a rear-view mirror of said vehicle and dimensioned to allow a driver to view objects positioned lateral to a passenger's side of a rear portion of said vehicle by looking at a reflection of said objects reflected from said first lateral-view mirror to said rear-view mirror to said driver;

providing a second lateral-view mirror;

attaching said second lateral-view mirror to said spoiler of a vehicle proximate a driver's side portion of said vehicle so that said second lateral-view mirror is positioned in a line of sight with said rear-view mirror of said vehicle and dimensioned to allow a driver to view objects positioned lateral to a driver's side of a rear portion of said vehicle by looking at a reflection of said objects reflected from said second lateral-view mirror to said rear-view mirror to said driver; and said driver looking into said rear-view mirror so as to view objects positioned lateral to a rear portion of said vehicle.

* * * * *